United States Patent [19]

English et al.

[11] 4,250,665
[45] Feb. 17, 1981

[54] PLANTER SYSTEM

[76] Inventors: Roy L. English; Irene F. English, both of 2733 SE. 31st, Portland, Oreg. 97202; Roy V. English, P.O. Box 1006, Fairbanks, Ak. 99701

[21] Appl. No.: 942,822

[22] Filed: Sep. 15, 1978

[51] Int. Cl.³ .............................................. A01G 9/02
[52] U.S. Cl. ........................................ 47/81; 47/66; 47/71
[58] Field of Search ................................ 47/79–81, 47/66, 59–64

[56] References Cited

U.S. PATENT DOCUMENTS

| | | | |
|---|---|---|---|
| 869,523 | 10/1907 | Schmidt | 47/66 |
| 1,513,829 | 11/1924 | Klow | 47/66 |
| 2,084,005 | 6/1937 | Richards | 47/80 |
| 2,556,522 | 6/1951 | Cienfuegos | 47/81 |
| 2,695,474 | 11/1954 | Barstow | 47/81 |
| 2,865,137 | 12/1958 | Longacre | 47/80 |
| 3,555,729 | 1/1971 | Chute | 47/81 |
| 3,739,524 | 6/1973 | Rose | 47/81 |

FOREIGN PATENT DOCUMENTS 342027  12/1959  Switzerland ............................... 47/81

*Primary Examiner*—Robert E. Bagwill

[57] ABSTRACT

A planter system is provided which controls the rate of evaporation of moistening liquid and continuously supplies liquid to growth media contained therewithin. The planter system comprises a means for housing the growth media and a means for storing moistening liquid. A transferring means within the housing and storage means transports the moistening liquid from the storage means to the growth media. The housing and storage means are adapted for movement to an open or closed position. In the open position, a passageway is formed for adding water to the storage means. In the closed position, the storage means is completely enclosed, thereby minimizing evaporation so that it is not necessary to add water thereto for extended periods of time.

10 Claims, 17 Drawing Figures

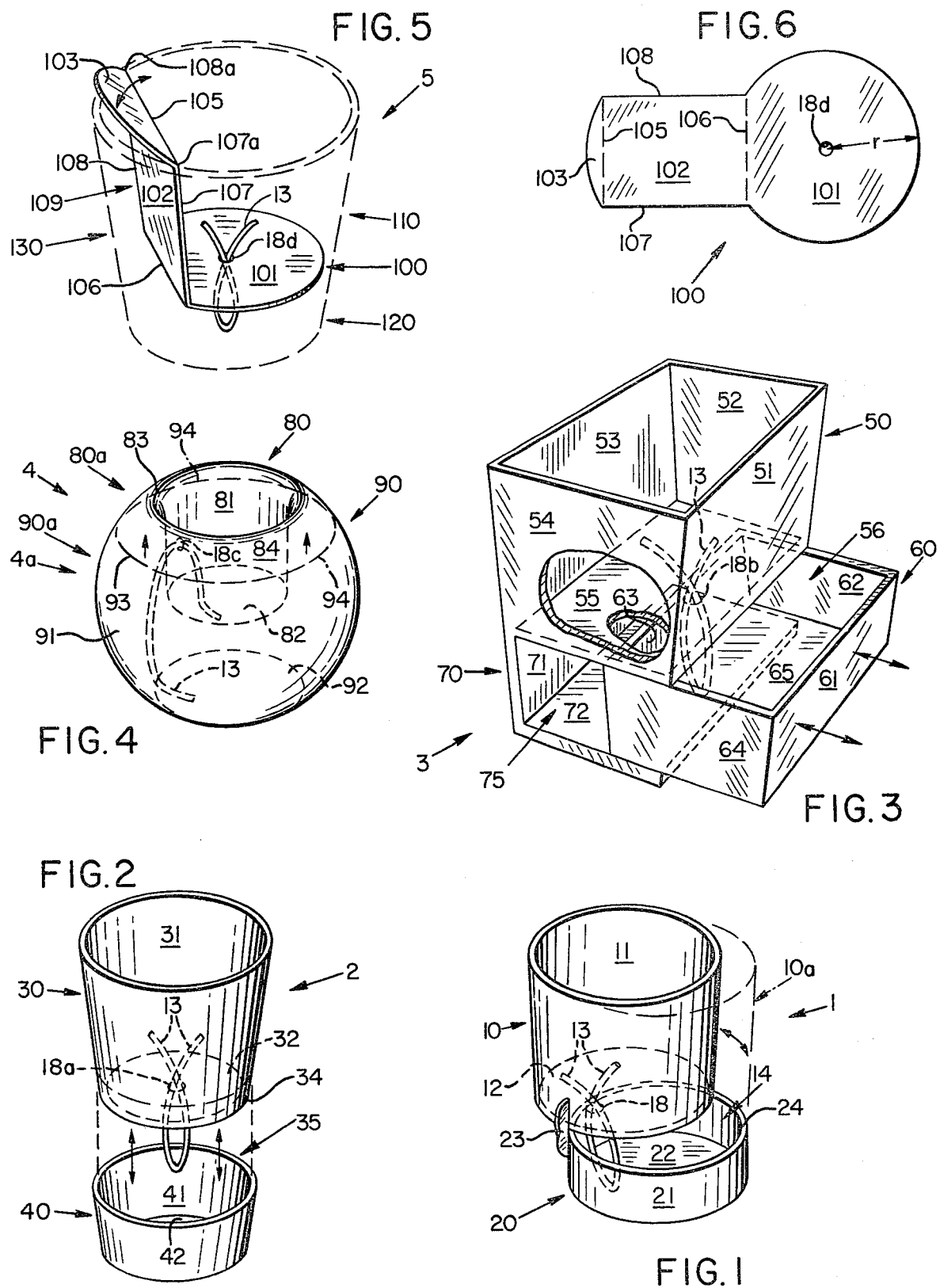

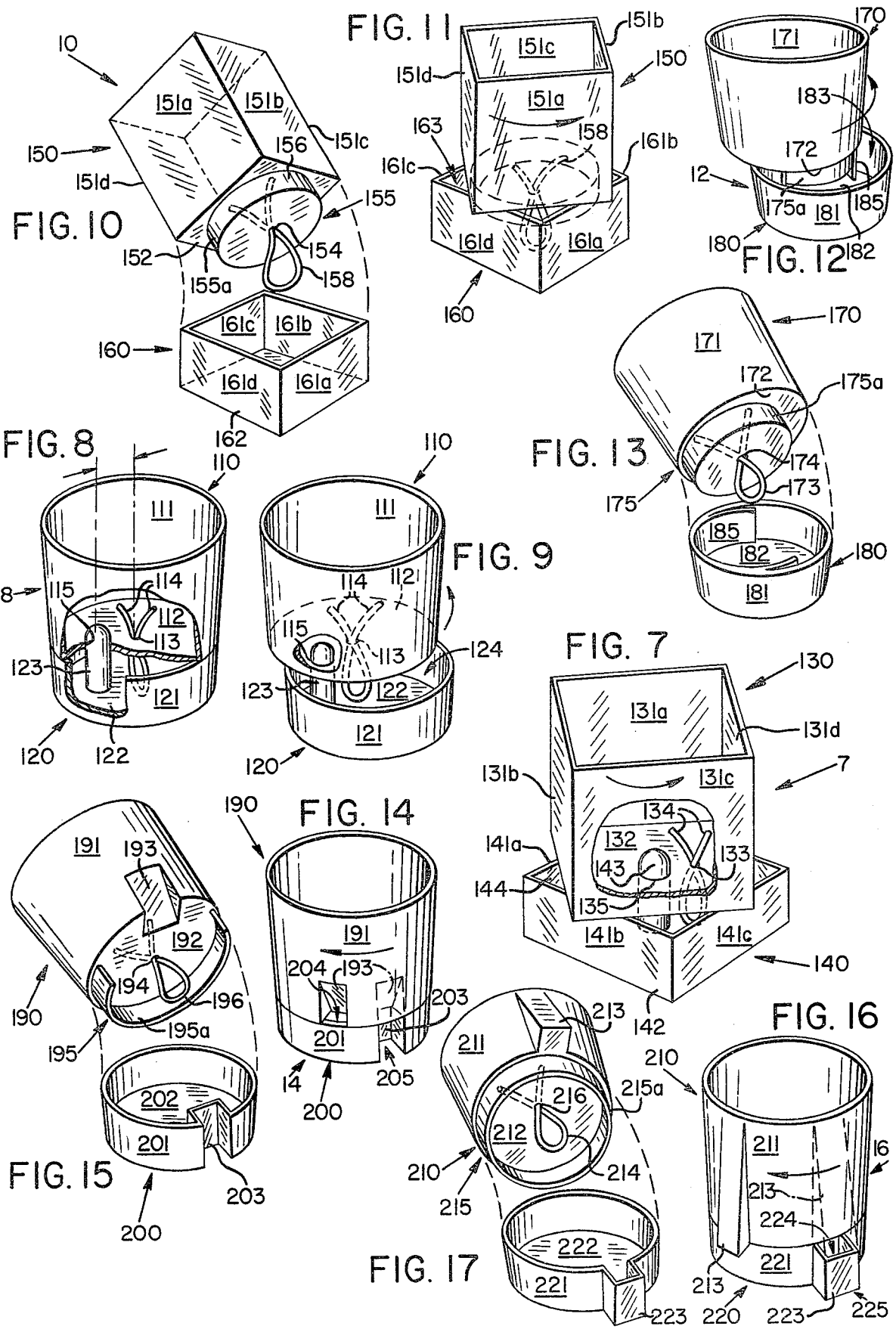

4,250,665

1

PLANTER SYSTEM

BACKGROUND OF THE INVENTION

This invention relates to a planter system which continuously maintains plants and growth media in a properly moistened condition, thereby eliminating the need for the high degree of attention required to ensure plant health.

Prior art planters generally contemplate an open-top container structure in which plant and soil are located. Moistening is generally accomplished by pouring water directly into the soil through the open top of the container. A saucer-like base can also be provided to retain any excess drain-off of water. Because of the open nature of the container and, if employed, the saucer-like base, evaporation is uncontrolled. Therefore, refilling of the planter takes place at frequent, uncontrolled intervals, the plant being subjected to alternate periods of drought and flooding. Furthermore, if the plant requires minimal moistening, such as a cactus or an African violet, small amounts of liquid must be continually added in order to prevent an over-watering situation.

Certain electronic devices which are presently available measure the moisture content of the soil. Unfortunately, these devies are quite expensive and are easily made inaccurate due to their relatively high sensitivity.

Other commercially available planters have wicking means located exterior to the planter confines for transferring moisture upward from a saucer-like base and into the top of the container. However, this exposed water source is also subject to the problems of rapid evaporation and continual refilling.

SUMMARY OF THE INVENTION

The subject planter system provides a closed, integral system adapted for controlling both evaporation and the rate of addition of moisture to the growth media contained within the planter system. The planter system comprises a means for housing the growth media, such as soil and the like, and a means for storing a moistening liquid adapted for communication with the housing means, the housing and storage means, respectively, which completely surround the liquid to minimize evaporation thereof. This is contrary to prior art planters which provide an open system resulting in the uncontrolled evaporation of moistening liquid. The respective housing and storage means are preferably selectively movable, one with respect to the other, to an open or closed position. In the open position, a passageway is provided for adding a moistening liquid to the storage means. A means located completely within the confines of the respective housing and storage means is provided for transferring the liquid, in a controlled manner, to the growth media. Preferably, this controlled transfer is accomplished by employing a media which transports the liquid by capillary action. The transferring means preferably extends from within the growth media in the housing means to the lowest point possible below the surface of the liquid in the storage means. The addition of moistening liquid, according to most prior art devices, is accomplished by means of pouring same directly into the growth media, not by the indirect, controlled transfer technique described herein. The point of entry of the transferring means into the storage means is located above the level of liquid contained herein.

As hereinafter set forth in more specific detail, novel means are preferably provided for filling the storage means which are an integral part of the planter structure. In general, a liquid is added to the storage means by selectively moving the first housing to a position with respect to the second housing wherein an open passageway to the storage means is provided. In this way, the problems associated with the direct addition of liquid to the growth media are avoided.

In a seris of embodiment, a planter system including housing and storage means is adapted for rotational movement to an open or closed position. For example, the respective housing and storage means can be mutually attached at a fixed point and is selectively movable in a substantially circular arcuate path one with respect to the other. Therefore, when the housing means is moved to an open position, a filling passageway is formed in the area traversed by the housing means.

In another form of this invention, the housing means is in nesting engagement with the storage means. Thus, when the housing means is disengaged from the storage means, the entire opening in the top of the storage means is exposed and serves as a filling passageway.

Another structure contemplated herein comprises a planter system in which the housing means, or a portion thereof, is hinged and is adapted for selective movement in an arcuate path to open or closed positions with respect to the storage means. In the open position, the requisite filling passageway is created.

In another embodiment, the housing means is provided with a means for support, above the surface on which it stands. A housing means is selectively movable with respect to the storage means on a support means. For filling purposes, the storage means is selectively moved in a substantially horizontal plane away from the planter structure so that the opening in the top of the storage means is exposed for receiving moistening liquid.

The planter system of this invention can also be fabricated as a multi-compartment container system, for example, inner and outer compartments substantially concentrically disposed one with respect to the other and joined by a common upper rim to form a unitary planter structure. The inner compartment comprises the housing means and the enclosed space between the respective compartments serves as the storage means for the moistening liquid. Filling is accomplished through a sealable opening in the planter system. The above-described multi-compartment system can also be produced employing an existing container. More specifically, by fitting adapter means within the confines of the above container, respectively, housing and storage means can be provided, as well as means for adding liquid to the storage means.

DETAILED DESCRIPTION OF THE DRAWINGS

FIG. 1 is a perspective view of a planter system having housing and storage means adapted for rotational movement to an open and closed position.

FIG. 2 is an exploded, perspective view of a planter system having housing and storage means nestable one with respect to the other and adapted for movement to an open and closed position.

FIG. 3 is a perspective view of a planter system having housing and storage means adapted for sliding movement to an open and closed position.

FIG. 4 is a perspective view of a unitary planter system.

FIG. 5 is a perspective view of a single compartment planter system, converted into a multi-compartment system by incorporating therein an adapter means 100.

FIG. 6 is a plan view of the adapted means 100 of FIG. 5.

FIG. 7 is a partially-broken, perspective view of a second planter system having a rectangular cross-sectional configuration and adapted for rotational movement to an open or closed position.

FIG. 8 is a partially-broken, perspective view of the counterpart planter system of FIG. 7, having a circular cross-sectional configuration and adapted for rotational movement to an open or closed position.

FIG. 9 is the planter system of FIG. 8 in the open position.

FIG. 10 is an exploded, perspective view of a third planter system, having a rectangular cross-sectional configuration, and adapted for rotational movement to an open or closed position.

FIG. 11 is the planter system of FIG. 10 in the open position.

FIG. 12 is a perspective view of the counterpart planter system of FIG. 10, having a circular cross-sectional configuration, which is shown in the open position.

FIG. 13 is an exploded, perspective view of the planter system of FIG. 12.

FIG. 14 is a perspective view of a fourth planter system having a circular cross-sectional configuration and adapted for rotational movement to an open or closed position.

FIG. 15 is an exploded, perspective view of the planter system of FIG. 14.

FIG. 16 is a perspective view of a fifth planter system, having a cross-sectional configuration, and adapted for rotational movement to an open or closed position.

FIG. 17 is an exploded, perspective view of the planter system of FIG. 16.

DETAILED DESCRIPTION OF THE INVENTION

FIGS. 1–17 of the subject drawings describe the preferred embodiments of this invention. The planter system 1 of this invention, which provides an integral, closed liquid storage system for controlling both evaporation and the rate of addition of moisture to growth media, comprises, inter alia, a means 10 for housing said growth media. More specifically, in FIG. 1, the housing means 10 includes a substantially vertical sidewall means 11, and substantially horizonal floor means 12 joined together one to the other. Housing means 10, as depicted in FIG. 1, is substantially cylindrical in shape, having a substantially circular x-sectional configuration. The top of housing means 10 is open to the atmosphere. The growth media (not shown), which can include soil or the like, in which plants or other vegetation can be effectively and efficiently grown, is added to confines of housing means 10.

The planter system of this invention also includes a means 20 for storing the moistening liquid. Storage means 20 and housing means 10, respectively, are adapted to completely surround the liquid for minimizing evaporation. The housing and storage means, 10 and 20, are disposed one with respect to the other for selective movement to an open or closed position. In the open position, a passageway is provided for adding a moistening liquid to the storage means.

In FIG. 1, storage means 20 is attached to housing means 10 by connecting means 23. Housing and storage means 10 and 20 are adapted for rotational movement one with respect to the other, to an open position (as shown), housing means 10 having been moved from closed position 10a (see phantom) to an open position in which passageway 14 is formed for filling storage means 20 with moistening liquid. To close the passageway for use as a planter, housing and storage means 10 and 20 are rotated one with respect to the other so that they are axially-aligned. The storage means 20 comprises a substantially vertical sidewall 21 joined to a substantially horizontal floor member 22. The top of storage means 20 is open to facilitate filling thereof with a moistening liquid. Means 10 and 20 are axially-aligned one atop the other to form a closed, integral planter system with a minimal amount of evaporation from storage means 20. Thus, maximum control of evaporation is provided by the engagement of floor 12 of housing means 10 with the upper edge 24 of vertical sidewall 21.

In order to convey, in a controlled manner, the moistening liquid in storage means 20 to the growth media in housing means 10, transferring means 13 is provided which extends at one end into the liquid in storage means 20, preferably to the lowest point possible below the surface of the liquid in the storage means, and at the other end into the growth media in housing means 10. An opening 18 is located in floor 12 through which said transferring means 13 passes and is maintained. The point of entry of the transferring means 13 (through opening 18) is located at a point above the level of the liquid contained in storage means 20. Transferring means 13 preferably comprises means which convey the moistening liquid by capillary action, i.e., the attraction between the molecules of moistening liquid and fibrous medium, which results in the rise of the liquid from storage means 10 through, for example, the small fibers in the fibrous medium, and then into the growth media. The transferring means 13 is generally located entirely within the confines of means 10 and 20, respectively. Preferably, in each of the planter systems described herein, the transferring means will move the moistening liquid from the lowest possible level in the storage means to the growth media in the housing means. The preferred type of transferring means is in the form of a wick means or like fibrous network. Generally, the transferring means 13 is made from material which will effectively convey the moistening liquid to the growth media and will substantially resist the effects of moisture and any detrimental elements in the growth media for a reasonable period of time.

An opening 18 is provided in housing means 10 through which, as previously described, transferring means 13 passes. The opening 18 can be located at any point in housing means 10 which is above the moistening liquid level in storage means 20 and within the confines of the planter. More specifically, the opening must be located at a point which, when transfer means 13 passes therethrough, it will be totally within the confines of the housing and storage means.

In the planter of FIG. 1, the opening 18 is in the floor member 12. While, in the planter hereinafter described FIG. 4, the opening 18c is in sidewall 81. More specifically, during use the planter system is maintained in a closed position (phantom) with sidewalls 11 and 21, respectively, being in vertical alignment one with the other. For filling purposes, housing means 10 is moved to an open position, wherein sidewalls 11 and 21 are not vertically aligned, thereby forming filling passageway 14. Connecting means 23 is fabricated of a material which will permit housing means 10 to be moved to an open position, while maintaining attachment between respective housing and storage means 10 and 20. A flexible polymer is therefore preferably employed as the construction material for connecting means 23.

Further embodiments of this invention in which respective housing and storage means are adapted for rotational movement one with respect to the other, for purposes of providing a passageway to add moistening liquid to the storage means, include the planter system depicted in FIGS. 7-17. The housing and storage means of all the planter systems of FIGS. 7-17 are also adapted for assembly and disassembly one with respect to the other. For example, a planter system 7, having a rectangular cross-sectional configuration, is shown in FIG. 7 which comprises housing means 130 adapted for rotational movement with respect to storage means 140. Housing means 130 includes vertical sidewall means 131a-131d and horizontal floor means 132, while storage means 140 includes vertical sidewall means 141a-141d and horizontal floor means 142. Floor means 132 includes an opening 133 through which transferring means 134, as previously described herein, passes and is maintained for conveying moistening liquid from within storage means 140 to the growth media (not shown) located within housing means 130. Housing means 130 is adapted for engagement and disengagement within storage means 140. More specifically, an opening 135 is provided in floor member 132 which is adapted for engagement and disengagement with, preferably by frictional interaction, a connecting means 143. Generally, means 143 connects housing means 130 and storage means 140, maintaining housing means 130 in a fixed position atop storage means 140. Connecting means 143 is preferably a vertically-disposed stanchion, extending upwardly from within the confines of storage means 140, and is preferably connected at its lower end to floor means 142. Preferably, the upper end of connecting means 143 passes through opening 135 so that on engagement with floor means 142, preferably frictional engagement, housing means 130 is positioned atop storage means 140.

Planter 7 is shown in FIG. 7 in the open position, housing means 130 having been rotated with respect to storage means 140 from a closed position, with sidewalls 131a-131d in vertical alignment with sidewalls 141a-141d, to an open position in which the respective sidewalls are not aligned one with the other. In the open position, a passageway 144 is formed for adding to planter system 7 a moistening liquid. In the closed position (not shown) a closed, integral planter system is provided for use as previously described.

A counterpart of the invention set forth in FIG. 7 is provided in FIGS. 8 and 9, differing in that a circular cross-sectional configuration is provided in the latter embodiments. More specifically, planter system 8, which is shown in a closed position in FIG. 8, and in the open position in FIG. 9, comprises a housing means 110 and a storage means 120 adapted for assembly and disassembly as previously described. Housing means 110 includes sidewall means 111 and floor means 112, and storage means 120 includes a sidewall means 121 and floor means 122. Floor means 112 has an aperture 113 located therein for receiving transferring means 114 and is similar in construction and purpose to aperture 133. Also, opening 115, which is similar in construction and purpose to opening 135, is located in floor means 112. Connecting means 123 is also similar in structure and purpose to connecting means 143. Preferably, connecting means 123 is connected to floor means 122 at its lower end, and at its upper end is adapted for engagement and disengagement, preferably frictional, with the floor means 112. However, since the cross-sectional configuration of planter 8 is circular, connecting means 123 must be provided within storage means 120 at a point other than the midpoint of floor means 122. Therefore, on rotational movement of housing means 110 with respect to storage means 120, a passageway 124 is formed for adding moistening liquid to said storage means. Contrarily, if connecting means 123 were affixed to the midpoint of floor means 112, so that sidewalls 111 and 121, respectively, were in vertical alignment, no such passageway 124 would be provided upon rotational movement.

FIGS. 10 and 11 depict a planter system 10 which includes housing means 150 and storage means 160, and is similar in rectangular cross-sectional configuration and in function to planter system 7 (see FIG. 7). However, planter system 10 differs structurally from planter system 7 in that connecting means 155 of planter system 10 comprises a protuberance which is joined to the bottom of, and extends below, housing means 150. Preferably, connecting means 155 is cylindrical in shape. Housing means 150 includes a sidewall means 151a-151d and floor means 152, while storage mans 160 comprises sidewalls 161a-161d and floor means 162. The connecting means 155 can comprise an annular member attached to the bottom of housing means 150. However, it is preferable that connecting means 155 be a cylindrical walled depression in floor means 152. Typically, the hollow walled depression is fabricated by vacuum-forming same in floor means 152. The maximum width of connecting means 155 is preferably less than the width of sidewall means 151a-151d for facilitating the requisite engagement of connecting means 155 and storage means 160. Connecting means 155 is adapted for mating engagement, preferably frictional engagement, with sidewall means 161a-161d of storage means 160. Therefore, planter system 10 is readily assembled and disassembled by matingly engaging connecting means 155 within the confines of storage means 160, or disengaging same therefrom. As shown in FIG. 11, when housing means 150 is rotated to an open position with respect to storage means 160, so that sidewalls 151a-151d are not in vertical alignment, a passageway 163 is formed for adding moistening liquid to said storage means 160.

FIGS. 12 and 13 delineate a planter system 12, which includes a connecting means 175. Planter system 12 is similar to planter system 10, differing therefrom in that housing means 170 and storage means 180 have a circular cross-sectional configuration. Housing means 170 is comprised of sidewall means 171 and floor means 172. Storage means 180 includes sidewall means 181 and floor means 182. Connecting means 175 preferably comprises a cylindrical walled depression 172a formed within floor means 172 and extending below housing means 170. As in the case of connecting means 123 of planter system 8, connecting means 175 is positioned off-center with respect to the midpoint of storage means 180, so that housing means 170 rotates with respect to storage means 180 about a point other than the midpoint of floor means 182, but at a point circumscribed by floor means 182. Thus, the vertical axis of connecting means 175 does not coincide with the midpoint of floor means 182 but is within the area circumscribed by floor member 172. A curved ridge 185, adapted for mating engagement with support means 175, is formed within storage means 180, and is preferably attached to the upper side of floor means 182. Ridge 185 is positioned within the confines of storage means 180 such that, on assembly of planted system 12, connecting means 175 is in mating engagement with ridge 185. In the closed position, respective sidewall means 171 and 181 will be in vertical alignment one with respect to the other. A passageway 183 is formed when housing means 170 is rotated to an open position with respect to storage means 180 (see FIG. 12). Preferably, connecting means 175 is adapted for engagement, preferably frictional engagement, with retaining ridge 185. This permits easy assembly (see FIG. 12) and disassembly (see FIG. 13) of planter system 12. An opening 174 is provided in floor member 172 through which transferring means 173 passes and is maintained for conveying moistening liquid as previously described.

FIGS. 14–17 pictorially describe two planter systems 14 and 16, each having a circular cross-sectional configuration, and both of which are similar to the rectangular planter systems of FIGS. 10 and 11. Planter system 14 includes housing means 190 and storage means 200, while planter system 16 comprises housing means 210 and storage means 220. Although planter systems 14 and 16 have a circular cross-sectional configuration, as in previously-described embodiments, they also include filling means 205 and 225 which, when axially-aligned housing and storage means are rotated one with respect to the other, form passageways 204 and 224, respectively. This permits moistening liquid to be added to storage means 200 and 220 without offsetting the connecting means.

In FIGS. 14 and 15, a planter system 14 is provided having a housing means 190 comprised of sidewall means 191, floor means 192 and storage means 200 which comprises sidewall means 201 and floor means 202. A connecting means 195, which in this case is a protuberance 195a, extends from the underside of floor means 192. As in planter system 10, the maximum width of connecting means 195 is preferably less than the width of sidewall means 201. However, connecting means 195 can also extend sidewall means 201 and serve the same function as described above. Connecting means 195 is adapted for mating engagement, preferably frictional engagement, with sidewall means 201. Preferably, planter system 14 is assembled (see FIG. 14) by engaging connecting means 195 so that it is in communication with storage means 200, or disassembled (see FIG. 15), by disengagement thereof. An aperture 194 is included in floor means 192 through which transferring means 196 passes and is maintained, as previously described. Filling means 205 comprises slots 193 and 203, respectively. Slot 193 is preferably included in the lower portion of housing means 190, while slot 203 is preferably included in the upper portion of storage means 200. Slots 193 and 203 are vertically aligned for engagement one with respect to the other to form a closed, integral planter system as previously described herein. When, however, the addition of moistening liquid to storage means 200 is required, housing means 190 is rotated with respect to storage means 200 so that slots 193 and 203 are not in vertical alignment. This creates a passageway 204 between slot 193 and sidewall means 201 through which the moistening liquid can be added.

Planter system 16 (see FIGS. 16 and 17) is structured similarly to planter system 14, except that filling means 225 comprises upper and lower appendages 213 and 223, respectively. Planter system 16 comprises housing means 210, including sidewall means 211 and floor means 212, and storage means 220 including sidewall means 221 and floor means 222. Connecting means 215, preferably a protuberance 215a as previously provided, is connected to the underside of floor means 212 as described above. When the planter system 16 is in the closed position, appendages 213 and 223 are vertically aligned one with respect to the other. In the open position, housing means 210 is rotated with respect to storage means 220 so that appendages 213 and 223 are not in vertical alignment. This provides a passageway 214 (see FIG. 16) between sidewall 211 and appendage 223. Transferring means 214 is maintained within aperture 216, located in floor means 212, for the purposes previously described.

Another planter system of this invention can be provided in which the storage and housing means are adapted for nesting engagement one with the other. In FIG. 2, a planter system 2 is depicted which comprises a housing means 30, including substantially vertical sidewall 31 and substantially horizonal floor 32, and a storage means 40, including substantially vertical sidewall 41 and substantially horizonal floor 42, which are disposed one with respect to the other for selective engagement, disengagement or movement to an open or closed position. More specifically, planter system 2 comprises a housing means 30 which is preferably tapered so that the top opening 34 is of larger diameter than the floor member. Therefore, housing means 30 and storage means 40 are adapted for nesting engagement one with respect to the other. To fill planter system 2 with liquid, it is moved to an open position, as shown in FIG. 2, by disengaging respective housing and storage means 30 and 40 so that the opening in the top of storage means 40 is completely exposed to the atmosphere. Thus, a filling passageway 35 is created. In use as a planter, system 2 is moved to a closed position so that the lower position 34 of housing means 30 is in nesting engagement with the confines of storage means 40 (see dotted lines in FIG. 2). A transferring means 13 passes and is maintained within opening 18a located in floor member 32 so that it extends into the confines of both the housing and storage means, as previously described.

A further preferred structure contemplated by this invention, planter system 3, is shown in FIG. 3. Storage means 60, including substantially vertical sidewalls 61–64 and substantially horizontal floor member 65, is in communication with housing means 50, including substantially vertical sidewalls 51–54 and a substantially horizontal floor member 55 for selective sliding movement to an open or closed position. Housing means 50 is maintained in an elevated position above the surface on which it resides by support means 70.

Support means 70 is L-shaped and comprises a vertical support member 71 joined to a horizontal support member 72. A channel 75 is formed within the confines area surrounded by floor member 55 and L-shaped support means 70. This channel 75 is adapted for sliding engagement with storage means 60. In ue, in a closed position such that the moistening liquid is completely surrounded by the housing and storage means, storage means 60 is located within the confines of channel 75 such that sidewall 63 engages vertical support member 71. Storage means 60 is slidably moved to an open position away from planter system 3 (see FIG. 3) until a substantial portion of the opening in storage means 60 is exposed to the atmosphere, creating a passageway 56. As previously described, transferring means 13, located within aperture 18b, is employed to convey moistening liquid from storage means 60 to the growth media.

In FIG. 4, a unitary planter system 4 is provided in which housing means 80 and storage means 90 are disposed one with respect to the other to form an integral closed system for controlling both evaporation and the rate of addition of moistening liquid to growth media contained within said housing means 80. More specifically, housing means 80 includes substantially vertical sidewall 81 and substantially horizonal floor member 82, while storage means 90 includes substantially vertical sidewall 91 and substantially horizontal floor member 92, joined at their respectie upper edges to form rim 83. An opening 18c is located in the upper portion of sidewall 81. This will permit a higher level of liquid to be added to storage means 90 than if the opening were located in floor member 82, since the liquid level must be below the point at which the opening is located. As heretofore described, transferring means 13 is located within opening 18c. A slit 93 is provided in sidewall 91. By pressing on the sidewall, which in this particular embodiment is flexible in nature, an opening can be made through which a filling passageway to storage means 90 is created. In an alternate form of this embodiment, FIG. 4a, the slit 93 can be extended around the total circumference of sidewall 91, denoted 94, to form a peripheral lip 84. Housing means 80a, comprising housing means 80 attached to peripheral lip 84, is disposed with respect to storage means 90a, i.e., storage means 90 minus peripheral lip 84 for selective movement to an open or closed position. In use, planter 4a is in the closed position as depicted in FIG. 4. For filling purposes, housing means 80a is moved to an open position by disengaging same from storage means 90a. A filling passageway is provided by exposing the opening in the top of storage means 90a.

A single compartment planter 130 is converted into a multi-compartment planter system 5 (see FIG. 5) by including therein adapter means 100. More specifically, as shown in detail in FIG. 6, adapter means 100 comprises a flat, substantially circular floor member 101 pivotally attached along 106 to substantially rectangular channel means 102, which is in turn pivotally attached along 105 to lid 103. Channel means 102 includes sides 107 and 108. The diameter of the floor member is substantially equal to the inner diameter of planter system 130 for a secure fit in a substantially horizontal position therewithin. Channel means 106 extends upward from floor member 101 so that sides 107 and 108 engage planter 130 to form a filling passageway therebetween. In addition, a multi-compartment structure is formed with a housing and storage means, 110 and 120, disposed in a single compartment one with respect to the other. The lid means 103 is selectively movable, preferably in an arcuate path, to an open and closed position. In the open position, moistening liquid can be added to storage means 120 via passageway 109.

The configuration of the planter systems of this invention can be of any shape capable of providing the above integral, closed liquid storage system for controlling both evaporation and the rate of addition of moisture to the growth media. However, the preferable configuration is either rectangular, square, spherical or eliptical.

In order to more easily and effectively visually observe the moistening level. the storage means is preferably fabricated of a transparent material, such as a transparent polymeric material. Typical materials which can be employed for this purpose include polyvinyl chloride, polyacrylates, polycarbonates and the like.

What is claimed is:

1. A planter system adapted for controlling both evaporation and the rate of addition of moistening liquid to growth media located therewith, comprising:
    (a) means for housing said growth;
    (b) means for storing said moistening liquid, the housing and storing means being disposed one with respect to the other for rotational movement to an open or closed position, in the closed position, the housing and storage means being in vertical alignment one with respect to the other, and in the open position, the housing and storage means not being vertically aligned so that a filling passageway is provided for adding said moistening liquid to said storage means;
    (c) means for transferring said moistening liquid, in a controlled manner, to said growth media; and
    (d) means for connecting said respective housing and storage means one to the other so that when the planter system is moved to an open position, attachment is maintained between the respective housing and storage means.

2. The planter system of claim 1 wherein said housing means and storage means are adapted for assembly and diassembly one with respect to the other.

3. The planter system of claim 1, wherein said connecting means is a vertically-disposed stanchion extending upwardly from within said storage means for engagement with said housing means.

4. The planter system of claim 1 wherein said connecting means is joined to said housing means at a point other than the midpoint thereof.

5. The planter system of claim 1, wherein the connecting means comprises a protuberance which is joined to the bottom of, and extends below, said housing means.

6. The planter system of claim 1, wherein said connecting means comprises an annular member attached to the bottom of the housing means.

7. The planter system of claim 1, wherein said connecting means is a cylindrical walled depression in said housing means.

8. The planter system of claim 5, further including vertically aligned filling means which, when axially aligned housing and storage means are rotated one with respect to the other, so that said filling means are not vertically aligned, forms a filling passageway for adding moistening liquid to said storage means.

9. The planter system of claim 8, wherein said filling means comprises upper and lower vertically aligned slots.

10. The planter system of claim 8, wherein said filling means comprises vertically aligned upper and lower appendages in said housing and storage means.

* * * * *